United States Patent [19]

Lipp

[11] Patent Number: 5,373,634
[45] Date of Patent: Dec. 20, 1994

[54] METHOD OF FORMING ALTERNATING-FLOW HEAT EXCHANGERS

[75] Inventor: G. Daniel Lipp, Painted Post, N.Y.

[73] Assignee: Corning Incorporated, Corning, N.Y.

[21] Appl. No.: 120,395

[22] Filed: Sep. 14, 1993

[51] Int. Cl.$^5$ .............................................. B23P 15/26
[52] U.S. Cl. .................................. 29/890.03; 29/890; 165/185
[58] Field of Search ................. 29/890.03, 890.07, 890, 29/557, 558, 527.6; 165/185, 164, 165

[56] References Cited

U.S. PATENT DOCUMENTS

| | | | |
|---|---|---|---|
| 4,271,110 | 6/1981 | Minjolle | 264/67 |
| 4,298,059 | 11/1981 | Krauth et al. | 165/166 |
| 4,421,702 | 12/1983 | Oda et al. | 264/62 |
| 4,426,762 | 1/1984 | Schnedecker | 29/890.03 |
| 4,746,479 | 5/1988 | Hanaki et al. | 28/890.03 |
| 4,807,342 | 2/1989 | Lapeyre | 29/890.03 |
| 5,095,973 | 3/1992 | Toy | 165/185 |
| 5,309,637 | 5/1994 | Moriarty | 29/890.03 |

*Primary Examiner*—Irene Cuda
*Attorney, Agent, or Firm*—Robert L. Carlson

[57] ABSTRACT

A method for preparing a alternating-flow heat exchanger is disclosed, in which a ceramic structure is provided having straight, open-ended passageways therethrough. Channels or orifices are drilled into the side of the structure, into and transverse to some of the passageways, and the open ends of these passageways are then plugged. The ceramic materials is fired for a temperature and for a time sufficient to form a monolithic ceramic alternating-flow structure.

19 Claims, 1 Drawing Sheet

METHOD OF FORMING ALTERNATING-FLOW HEAT EXCHANGERS

FIELD OF THE INVENTION

The present invention relates to a method for producing alternating-flow heat exchangers.

BACKGROUND OF THE INVENTION

Alternating-flow heat exchangers are heat exchangers in which gas or fluid may flow in at least two flow paths through the heat exchanger. Such heat exchangers have a variety of uses, such as, for example, as catalytic converters, furnace heat recuperators, turbine engine recuperators, and in process fluid heating or cooling. The same structure may also be used for cross-flow filters or bleed-through reactors.

Heat exchangers are typically formed by first extruding a honeycomb like body of ceramic material from a die orifice. The extrusion results in a block of ceramic material having flow channels or cells which are typically of square or other rectangular cross-section, arranged parallel and adjacent to one another along the axis of extrusion. To form alternating-flow heat exchangers, portions of the sides of the extruded block are commonly cut away to convert the ceramic block having only straight-through passages into a ceramic block alternating between rows of straight-through flow (primary flow), and rows of Z-flow, L-flow, U-flow or other similar alternate or cross directional flow (secondary flow) through the ceramic block.

The secondary-flow (Z-flow, L-flow, etc.) channels are typically made by sawing into the sides of some of the channels in the ceramic block and afterwards sealing the ends of these channels, thereby forming the secondary-flow channels. Examples of methods which utilize such sawing techniques to form Z-flow alternating-flow heat exchangers are disclosed in U.S. Pat. No. 4,271,110 to Minjolle, and U.S. Pat. No. 4,421,702 to Oda et al. U.S. Pat. No. 4,298,059 to Krauth et al. discloses a similar sawing method, wherein diamond cutting wheels are used to saw slots into an extruded body, after which time the ends of the slots are plugged to form an L-flow alternating-flow heat exchanger in which both flow directions through the heat exchanger follow an L-shaped path.

Such sawing techniques make it extremely difficult to produce high-quality alternating-flow devices, especially those having thin flow channels, and/or which alternate direction in every adjacent row (i.e. single alternating-flow channels or cells). This is because, to produce the secondary-flow channels in such devices, cell walls in the secondary-flow channels must be removed without sawing into adjacent walls. Such precision sawing is difficult in part because the prior art sawing techniques utilize large planar sawing devices, such as diamond cutting wheels. Such large planar cutting wheels must align with the channel to be removed, so that every point on the cutting wheel is at all times accurately aligned with each cell area to be removed. Otherwise, the cutting wheel will remove cell walls from adjacent cells, causing leakage problems. Accurate cutting is made more difficult by the fact that such planar cutting devices are susceptible to chattering, or vibration, during the cutting operation. Such chattering of the cutting wheel can, for example, cause the outer edges of the wheel to cut differently than the center area of the wheel.

Perhaps a bigger disadvantage occurs because, in the past, diamond wheel and other sawing techniques were used to remove entire channel sections from the ends of the extruded body. Consequently, once the cutting operation was complete, the end of the extruded body alternated between the still existing structure of the straight-through flow layers, and open gaps produced by the cutting wheels. To complete the formation of the secondary-flow channels, these relatively large open ends or gaps had to be plugged. Because of the relatively large section to be plugged, bars of material were typically employed which were wide enough to fit into these gaps, yet not so wide that they would force adjacent cells further apart. These plugging bars therefore had to be formed to a very exact tolerance, so that they fit accurately and consistently into each gap. This consistency of fit was sometimes made difficult by the fact that the sawing techniques, as explained above, do not always cut consistent width channels. Because of the large spaces which must be plugged, as well as the problem associated with plugging them, shrinkage voids, slumped plugging paste, and drying cracks in the plugging paste are not uncommon problems with these structures. Also, the larger the area to fill or plug, the more critical it will be to match thermal expansion coefficients between the filling and body materials. These differences in thermal expansion can result in cracking which results in leakage.

Also, because of the relatively large gaps left in the extruded structure between the straight-through flow channels, these structures are very weak prior to plugging. Consequently, care must be taken during manufacture to prevent bending of the ends of the straight-through channels prior to plugging. This is a problem regardless of whether sawing takes place prior to or after firing, but it is a particular problem when sawing takes place prior to firing, given the already relatively weak nature of the green ceramic ware.

The present invention is directed to a method for forming which avoids the deficiencies of prior art methods for forming alternating-flow heat exchangers.

SUMMARY OF THE INVENTION

One aspect of the present invention relates to a method for preparing an alternating-flow ceramic heat exchanger comprising:

providing a structure having a plurality of parallel rows of straight-through flow passages, said passages defined by cell walls, said passages having first and second opposite end openings;

channeling through the cell walls of a plurality of said passages to form a plurality of orifices transverse to and in communication with a plurality of said flow passages; and plugging at least one of said flow passages in communication with said third passage. Channeling, as used herein and in the appended claims, means that a channel or tunnel-like passage is formed in the side of selected flow channels in said structure, without the removal of the end portions of these selected channels, as was commonly done in the prior art. Plugging the ends of these selected channels results in an alternating flow heat exchanger whose secondary-flow channels are formed by the orifices, which are transverse to and communicate with the plugged channels. These transverse passages, which are formed by the channeling operation, may be cut to a wide variety of length and width channels having a wide variety of depths into the side of the structure. In accordance with the present invention, the channeling operation can be conducted using a variety of cutting or drilling devices, such as, for example, a rotating drill bit, a milling cutter, a knife blade having a suitable size and shape, or even a rotating cutting wheel, such as a diamond cutting wheel having a diameter roughly equal to the desired length of the transverse passage to be channeled. The important feature consistent with each of these channeling devices is that they enable removal of portions of the side of the extruded body without removal of the end portions of these passages, which would result in open slot areas, as did prior art methods.

The methods encompassed by the present invention have numerous advantages over prior art methods for forming alternating-flow heat exchangers. Because the entire honeycomb end structure of the extruded body is left intact, the secondary-flow channels may be completed by merely plugging the existing honeycomb structure, rather than having to use plugging bars to bridge large gaps. Thus, the ends of the secondary-flow channels are more easily plugged. Further, because of this remaining support structure, the overall strength of the heat exchanger is increased, both during the manufacturing operation and after completion, since there are no large open gaps between channels at the ends of these heat exchanger structures to weaken them.

DETAILED DESCRIPTION OF THE DRAWINGS

Figure 1:
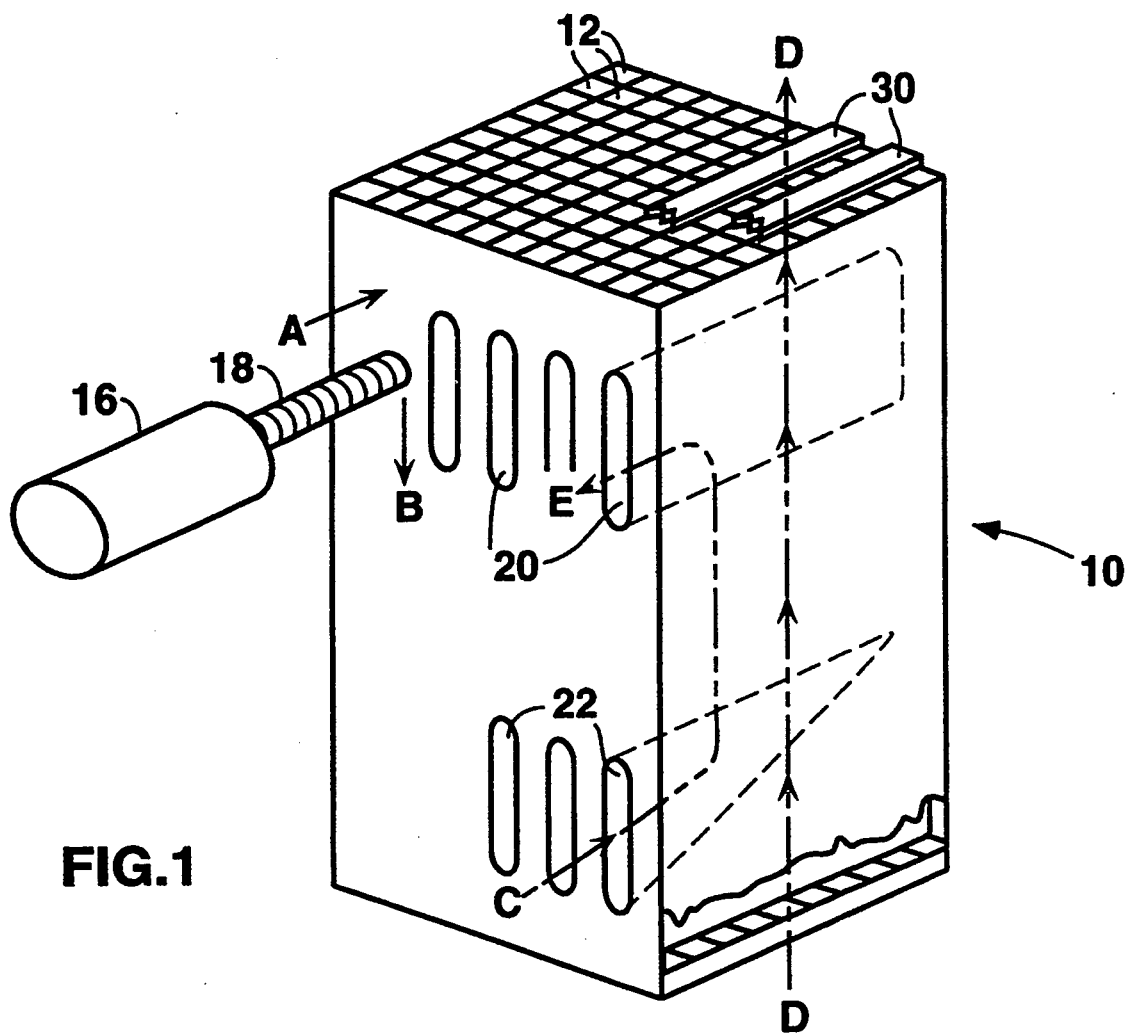
FIG. 1 is a perspective view of an extruded ceramic body having straight through flow passages, and illustrates a drill being used in accordance with the present invention to open transverse passages in said body to form secondary-flow passages.

FIG. 1 illustrates a perspective view of a ceramic body 10 having a plurality of straight through flow passages 12, each of the flow passages being parallel to one another and having open and opposite ends. In the embodiment illustrated in FIG. 1, ceramic body 10 was produced using an extrusion technique, which is the preferred method of manufacturing the initial ceramic body. However, other methods could be used to make these and similar structures, such as, for example, laying up alternating flat and corrugated layers of metal or ceramic materials. In its original form, fluid would flow straight through passageways 12 of ceramic body 10 and out through the end orifices of channels 12. As illustrated, passages 12 of ceramic body 10 are of square cross-section. However, other cell shapes could also be employed, such as, for example, triangular or rectangular.

In accordance with the present invention, the extruded body, which originally has only straight-through flow passages, is converted into one having alternating primary and secondary flow passages. To accomplish this conversion, a drill or similar cutting tool is provided which is capable of channeling into a portion of the length of the passageways 12. As illustrated in FIG. 1, for example, drill motor 16, which drives drill bit 18, is shown positioned to drill into the side of ceramic body 10 and thereby remove a precise portion of one of the passageways 12. By moving rotating drill 18 in the direction indicated by arrow A, drill 18 will drill into the side of ceramic body 10. In a preferred embodiment, the diameter of drill bit 18 is chosen, and drill bit 18 is aligned, so that drill bit 18 removes only the walls from a single row of passageways, without removing material from adjacent passageway walls. In this way, as illustrated in FIG. 1, alternating-flow devices can be made which have single cell alternating primary and secondary flow channels. As used herein, the designation of a channel as primary or secondary is purely random, and thus the terms may be interchanged. To facilitate explanation, however, primary will be used herein to refer to the completely straight flow paths, in structures which have such flow paths.

After drill bit 18 has been moved in direction A so that it has drilled a desired distance into the side of ceramic body 10, the drill 18 is moved downwardly in the direction indicated by arrow B to thereby enlarge the drilled area to the desired size and shape. This channeling procedure results in the formation of a side-drilled passageway or orifice 20 which is transverse to and in communication with a plurality of the straight-through flow passages of the original extruded body 10, as illustrated in FIG. 1. This process is repeated a number of times to obtain the desired number of orifices 20.

A technique similar to that described immediately above is also used to form side-drilled passageways 22, as illustrated in FIG. 1, which are in communication with the same straight-through flow passages as side-drilled passages 20. For passageways 22, however, a beveled shape was desired. This is accomplished, for example, by initially drilling drill 18 into the upper edge of the desired channel 22. Then, the leading edge of drill 18 is kept stationary while the end of drill 18 nearest drill motor 16 is moved downwardly, resulting in the formation of a diagonal shaped opening 22. Such diagonal shape facilitates funneling of fluid through the secondary-flow channel.

Figure 2:
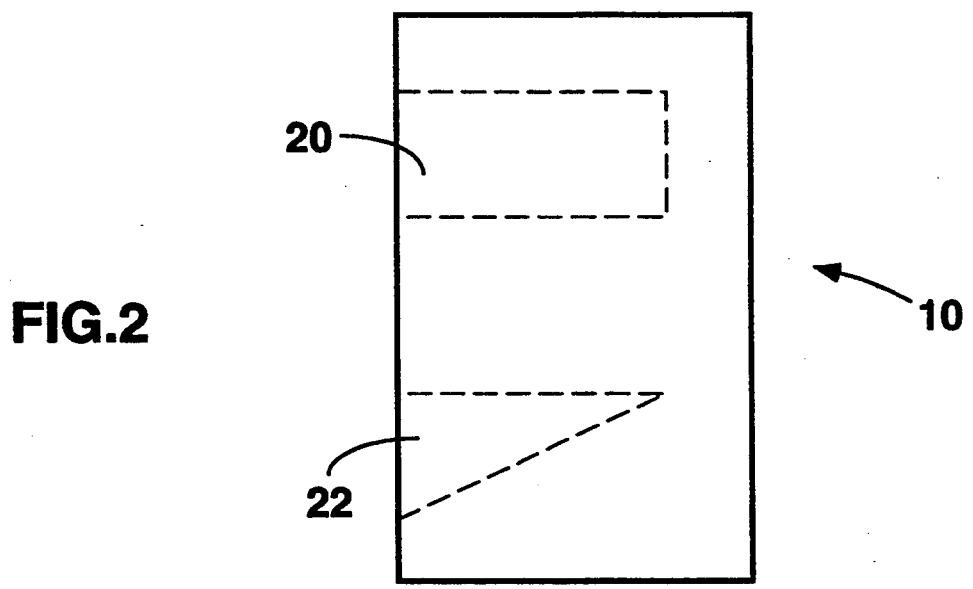
FIG. 2 is a side view of the heat exchanger illustrated in FIG. 1.

In the embodiment illustrated in FIGS. 1 and 2, side drilled passageways 20 and 22 are not drilled completely through to the opposite side of ceramic body 10. Consequently, a single input manifold and a single exhaust manifold can be employed to channel fluid into channels 22 and out of channels 20, respectively. However, alternatively, channels 20 and 22 could be drilled completely through heat exchanger 10, in which case double input and exhaust manifolds could be utilized. In addition, channels 20 and 22 as illustrated have rectangular and triangular cross-sections, respectively. However, in the heat exchangers of the present invention, channels 20 and 22 could alternatively both be rectangular, or triangular, and so forth.

To complete formation of the parallel-flow heat exchanger, the end orifices of the secondary flow channels, namely, those channels 12 which are in communication with side-drilled passageways 20 and 22, must be plugged to prevent fluid from escaping therefrom. In the method of the present invention, this is achieved by plugging the end orifices of desired channels 12 using a suitable plugging material 30. The thickness of plugging material 30 in FIG. 1 is exaggerated for purposes of illustration. In most applications, it is preferable that the plugging material merely fill-in and plug the end openings of the secondary flow channels, without extending outwardly from the end of the ceramic body. Suitable methods and materials for plugging the ends of extruded ceramic bodies are well-known in the art. Such methods are explained, for example, in U.S. Pat. Nos. 5,021,204 to Frost et al. and 4,752,516 to Montierth, the specifications of which are hereby incorporated by reference. Preferable materials for plugging include the same material use to make the extruded body, mixed with colloidal silica or other suitable binders, as well as suitable commercial ceramic cements, such as those manufactured by the Sauereisen Cements Company of Pittsburgh, Pa.

By appropriately plugging both ends of the passageways which have side drilled openings 20 and 22, a plurality of U-flow shaped secondary-flow passageways are produced. Consequently, in the primary fluid flow path of the heat exchanger illustrated in FIG. 1, the primary fluid enters the heat exchanger unit parallel to its axis through straight-through flow channels 12 and flows in a straight path in the direction indicated by arrow D. The secondary fluid flow follows a U-shaped path, for example, entering the heat exchanger unit perpendicular to the axis of extrusion in the direction of arrow C via the orifices 22, then flowing through the straight through secondary passages towards the orifices 20, and out through orifices 20 in the direction of arrow E. Further, the U-flow path could also be in the opposite direction i.e., in orifice 20 and out orifice 22. Of course, the method of the present invention is not limited to making U-flow alternating-flow channels, but could also be used to make Z-flow, L-flow, and other shaped secondary flow channels. For example, by drilling side drilled passageways 22 in the face opposite the face in which passageways 20 were drilled, a Z-flow shaped secondary flow channel could be achieved.

Alternatively, by drilling side drilled passageways 22 in the primary flow passages, and drilling side drilled passageways 20 in the secondary flow passages, an L-flow heat exchanger, having symmetrical L-flow channels, could be obtained. In addition, in the embodiments illustrated in FIGS. 1 and 2, passageways 20 and 22 were drilled so that they resulted in relatively narrow passageways having a width of one flow channel. However, if desired, passageways 20 and 22 could be drilled to be two, three or more cells thick.

Drill 18 can alternatively be any suitable knife, milling cutter, or other cutting device capable of cutting a passageway of desired size into the side of the extruded body without removing material from the distal ends of the extruded body. Thus, for example, drill 18 could be replaced by an elongated knife member which can be pushed into the surface of the extruded body to removed the desired amount of material. In fact, in laboratory experiments a thin spatula was used to remove portions from dried, unfired extruded bodies in just this way with very successful results. Further, it is conceivable that small cutting wheels could be utilized, as long as the diameter of the cutting wheel is small enough to remove the desired portion of the channels without removing material all the way to the end of the passageways and extruded body.

A preferred application for the heat exchangers of the present invention is as a catalytic converter in an exhaust gas system. In such applications, where catalysis of cold side or hot side gases is appropriate, the heat exchangers may be, if desired, washcoated and catalyzed. Washcoating involves coating the insides of the flow channels with a slurry, typically of $Al_2O_3$ particles, to increase surface area and thereby promote catalytic activity. Catalyzing typically involves coating noble metal catalysts onto the oxide support materials (left by washcoating) by contacting the heat exchangers with an aqueous alkaline solution containing the noble metal cations. It is preferable to washcoat and/or catalyze the heat exchangers of the present invention prior to plugging, to enable access through the end orifices of each channel, and thereby provide a straight-through access to the flow paths of the body 10. Such straight flow paths greatly facilitate and increase the speed with which these processes can be achieved. Inspection is likewise facilitated, since visual inspection is possible through the straight flow paths. It is conceivable that washcoating and/or catalyzing could be done prior to the drilling operation, but it is preferable that drilling be done first. This is especially true with respect to catalyzing since catalyst material is relatively expensive. Therefore, it should be applied as late as possible during manufacturing to reduce the amount of scrap product.

Plugging of the ends of the secondary-flow channels can take place either before or after washcoating and/or catalyzing. However, in some instances, it is preferable that plugging take place after these steps, so that the washcoating and catalyzing processes can take place on a body having straight-through flow passageways. However, some plugging cements are cold set (i.e. do not require firing at high temperatures to make them harden or adhere), and therefore have limited high temperature capability, while other cements require a firing step that is hotter than some catalysts can survive. Therefore, it is desirable, when using such materials, to plug and fire the ceramic body prior to catalyzing.

A preferred forming material for the heat exchanger, especially when the heat exchanger is used as a catalytic converter, is cordierite. However, a variety of other useful ceramic materials, such as, for example, silicon nitride, silicon carbide, lithium alumino-silicate, mullite, zircon, and so forth, as well as non-ceramic materials, such as glass-ceramics, glasses, metals, cermets, polymers and other organic materials, and so forth, could also be employed. It should be noted, however, that this list is not all-inclusive, and other alternative materials could also be employed.

Applications for the heat exchangers of the present invention are not limited to catalytic converters in exhaust systems, but could also be, for example, furnace heat recuperators, turbine engine recuperators, process fluid heating or cooling devices, filters or bleed-through reactors. Similarly, the fluids transportable through these heat exchangers are not limited to gases, and therefore alternative cooling or heating fluids such as heat transfer oil, and so forth, could be utilized.

The invention may be more easily comprehended by reference to the following specific example. However, this example is provided solely for purposes of illustration, and it should be understood that the invention may be practiced otherwise than as specifically illustrated without departing from its spirit and scope.

EXAMPLE

Several 1000 g batches of dry powders are made of the components silica, magnesium oxide and aluminum oxide as raw materials for subsequent formation of a cordierite honeycomb. The raw material batches are each mixed with methyl cellulose as a binder and sodium stearate as a lubricant for the subsequent extrusion operation. The raw material oxides, methyl cellulose and sodium stearate are mixed in a Littleford mixer for about 3 minutes in order to obtain a homogeneous dry blend. The batch is then transferred to a plasticizing mixer such as a muller, sigma blade mixer, etc. and water is added to the dry components in an amount sufficient to form a plasticized batch. The resulting mix is blended for about 10–15 minutes to make a plastic mixture. A relatively square cross-section (about 70 mm × 70 mm), green honeycomb body is then extruded, having square cells, at about 16 cells/cm$^3$ (corresponding to a cell cross-sectional area of about 6 mm$^2$) and having a cell wall thickness of about 0.5 mm. The honeycomb structure has a length of about 100 mm.

The honeycomb body is then dried. A thin knife, having blade dimensions of about 6 mm wide, about 50 mm long, and about 0.5 mm thick, is then carefully directed at a 90 degree angle straight into one side of the dried, extruded body. The knife is used to dig a rectangular channel 20 having a width of about 1.7 mm, a length of about 10 mm, and a depth of about 40 mm into the extruded body. The channel is located about 10 mm from one end of the extruded body. By directing the knife straight into the body at a 90 degree angle, and keeping the knife positioned between adjacent cell walls, the knife opens the side cell walls of a selected single row of channels. This procedure is repeated in every other row of channels across the entire structure, so that the structure alternates between rows of straight-through flow channels, which are essentially unchanged from their extruded state, and rows of channels which are connected to transverse passageways created by the knife. A similar set of rectangular passages 22 is cut, on the same side of the extruded body, and into the same channels, but starting 10 mm from the other end of the extruded body, so as to form a plurality of U-flow secondary flow channels having rectangular passages or orifices 20 and 22, as was discussed above.

Each end structure of the resultant body is essentially unchanged from the end structures that existed as initially extruded. The ends of the selected secondary flow channels are then plugged by applying a slurry mixture, consisting of water and the extrusion batch material, to fill and/or cover the ends of each of the channels in the selected rows.

The green structure is then fired by heating to a temperature of about 1430° C. over a period of about 41 hours and maintaining that temperature for about 10 hours.

Although the invention has been described in detail for the purpose of illustration, it is understood that such detail is solely for that purpose and that variations can be made therein by those skilled in the art without departing from the spirit and scope of the invention.

I claim:

1. A method for preparing an alternating-flow heat exchanger comprising:
   providing a structure having a plurality of parallel rows of straight-through flow passages, said passages defined by cell walls, said passages having first and second opposite end openings;
   channeling through some of the cell walls of a plurality of said passages to form a plurality of first orifices transverse to and in communication with a plurality of said straight-through flow passages; and
   plugging an end opening of at least one of said flow passages in communication with said orifices.

2. The method of claim 1, wherein said structure in said providing step comprises an extruded body.

3. The method of claim 1, further comprising, prior to said channeling step, firing said structure.

4. The method of claim 1, wherein said plugging occurs after said channeling step.

5. The method of claim 1, wherein said plugging occurs prior to said channeling step.

6. The method of claim 1, further comprising, after said plugging step, firing said material at a temperature and for a time sufficient to form a monolithic ceramic structure.

7. The method of claim 2, further comprising, after said plugging step, firing said ceramic material at a temperature and for a time sufficient to form a monolithic ceramic structure.

8. The method of claim 1, wherein said orifice has a width which is less than or equal to the width of said passages.

9. The method of claim 1, further comprising channeling through the cell walls of a plurality of said straight-through passages to form a plurality of second transverse orifices transverse to and in communication with a plurality of said straight-through flow passages which are in communication with said first orifices.

10. The method of claim 1, wherein said structure is composed of a material selected from the group consisting of ceramic, glass-ceramic, glass, metal, cermet, and polymeric materials.

11. The method of claim 10, wherein said structure is composed of a ceramic material selected from the group consisting of cordierite, lithium alumino-silicate, silicon carbide, silicon nitride, mullite and zircon.

12. The method of claim 1, wherein said channeling comprises utilizing at least one rotating drill.

13. The method of claim 1, wherein said channeling comprises utilizing at least one knife means.

14. The method of claim 1, wherein said channeling comprises utilizing a rotating cutting wheel having a diameter relatively equal to the length of the orifice.

15. The method of claim 11, wherein said plugging step comprises utilizing a binder material mixed with a ceramic material selected from the group consisting of cordierite, lithium alumino-silicate, silicon carbide, silicon nitride, mullite and zircon.

16. The method of claim 15, wherein said binder material is colloidal silica.

17. A method of forming a U-flow alternating-flow heat exchanger according to claim 9, wherein said first orifices and said second orifices are on the same side of said structure.

18. A method of forming a Z-flow alternating-flow heat exchanger according to claim 9, wherein said first orifices and said second orifices are on opposite sides of said structure.

19. A method of forming a L-flow alternating-flow heat exchanger according to claim 1, wherein said plugging results in a plurality of channels having no more than one end opening plugged.

* * * * *